United States Patent Office 3,493,818
Patented Feb. 3, 1970

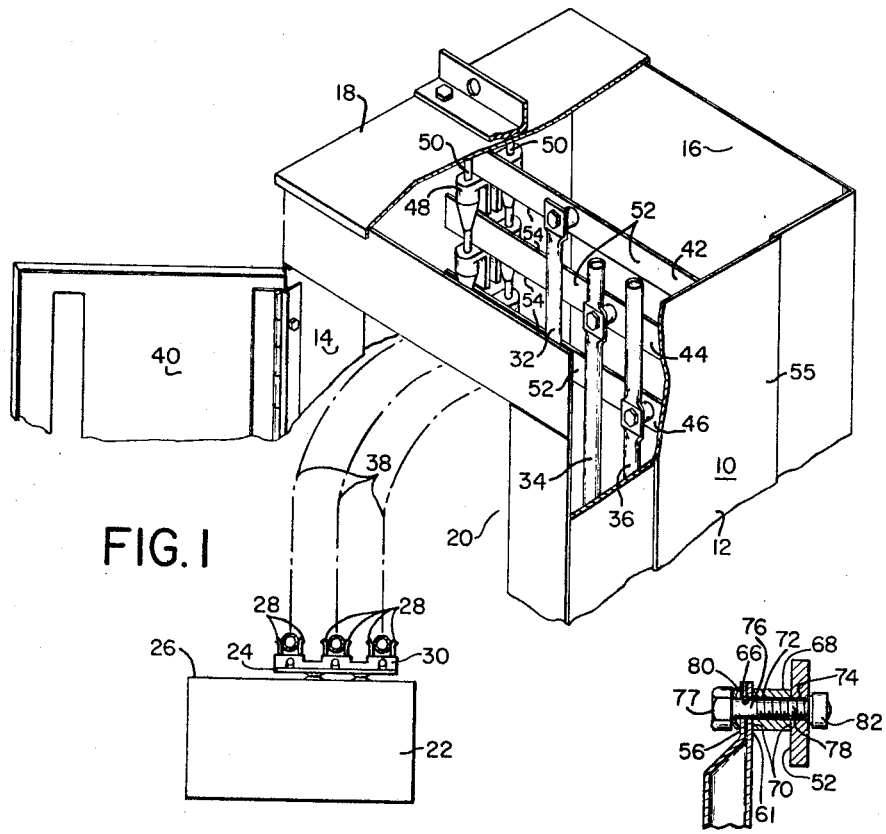

3,493,818
CONNECTION BETWEEN THE HORIZONTAL AND VERTICAL BUS BARS IN AN ELECTRICAL ENCLOSURE
Kenneth L. Paape, Mequon, and Edward J. Stark, Whitefish Bay, Wis., assignors to Square D Company, Park Ridge, Ill., a corporation of Michigan
Filed Dec. 11, 1967, Ser. No. 689,670
Int. Cl. H02b 9/00
U.S. Cl. 317—122                             10 Claims

ABSTRACT OF THE DISCLOSURE

This invention relates to a connection between the tubular vertical bus bars and the horizontal bus bars in an electrical control center wherein portions of the tubular bus bars are indented to provide a flat surface which is engaged by a flat surface on a spacer to provide a low cost efficient electrical and mechanical connection between the horizontal and vertical bus bars.

Background of the invention

This invention relates to electrical apparatus enclosures and more particularly, to connections between the bar-like horizontal bus bars and tubular vertical bus bars in an electrical apparatus cabinet.

Devices which are used to control the distribution of electric current to a plurality of electric loads, such as a number of motors from a central location, frequently are housed in compartmented structures called control centers. As occasionally the devices, such as relays, motor starters and contractors which are housed in the control center, may require service or replacement, control centers frequently are formed of a group of individual cabinet-like sections, each of which includes a plurality of cells or compartments wherein the devices are installed. To facilitate wiring and servicing, control centers are provided with main horizontal bus bars which extend across the upper portions of all of the individual sections and are connected to deliver current from a supply to groups of vertical bus bars in each section. The vertical bus bars in turn deliver current to the devices within the individual cells through separable jaw-like connectors which make contact with the vertical bus bars in a manner illustrated in United States Patent No. 2,648,032 which was granted on Aug. 4, 1953 to Earl F. Mekelburg. As shown in the Mekelburg patent, the tubular vertical bus bars are connected to the main horizontal bus bars by spacers which maintain at least one inch electrical clearance through air between the bus bars of opposite polarity. As the connection between the vertical bus bars and the horizontal bus bars is required to be mechanically sound and provide a maximum metal to metal conducting path between the vertical and the horizontal bus bars to minimize the temperature increase caused by the high currents passing through the connection between the vertical and the horizontal bus bars, in the Mekelburg structure the spacers have one end shaped to provide a saddle for the tubular outer surface of the vertical bus bars while the other end of the spacers are provided with a flat surface which is pressed into tight engagement with the flat surfaces of the horizontal bus bars. The tight engagement between the spacers and the vertical and the horizontal bus bars is achieved by screws passing through openings in the vertical bus bars and the horizontal bus bars and a bore extending through the spacers and suitable washers and nuts which are tightened on the screws and separate cylindrical solid metal inserts which were positioned internally in the tubular bus bars to prevent deformation of the tubular bus bars when the tubular bus bars were secured to the horizontal bus bars.

In certain control center installations, devices are installed in cells located at the extreme upper portion of the sections. When this arrangement is required at least one of the vertical bus bars is provided with a stub end that extends above its point of attachment with a horizontal bus bar to provide a point of connection for the separable jaw-like connectors for the devices. The stub end when present causes difficulties in properly positioning the separate insert within the tubular bus bar so the connection with the horizontal bus bar can be accomplished.

It is an object of the present invention to provide a low cost efficient electrical and mechanical connection between the tubular vertical bus bars and the flat horizontal bus bars in a control center which will provide proper clearance through air for the bus bars of opposite polarity and provide locations for jaw-like connectors so devices may be installed at the extreme upper portions in the control center without using especially machined spacers in the connection between the vertical and the horizontal bus bars and inserts within the tubular bus bars to prevent deformation of the tubular bus bars when the connection is made.

Another object is to provide a connection between a tubular vertical bus bar and a flat surface of a horizontal bus bar in a control center that includes an indented portion in the vertical bus bar, a spacer having a pair of spaced flat surfaces and a screw having a head portion received in the indented portion and a shank portion extending through aligned openings in the indented portion, the spacer and the horizontal bus bar for maintaining the flat surfaces on the spacer in tight engagement with the flat surface on the horizontal bus bar and a flat surface on the vertical bus bar which is formed by the indented portion.

A further object is to provide a control center with a plurality of vertically spaced horizontal extending bus bars each of which presents a flat surface in a vertical plane and a plurality of horizontally spaced vertically extending tubular bus bars and to connect each tubular bus bar to one of the horizontal bus bars with a low cost effluent electrical and mechanical connection that is formed by a flat external surface on each tubular bus bar, a spacer having a pair of spaced flat surfaces and a means including a screw having a shank portion extending through openings in the flat surfaces in the tubular and the horizontal bus bars and the spacer for maintaining the flat surfaces of the spacer in tight engagement with the flat surfaces on the tubular and the horizontal bus bars.

A further object is to provide a control center with a plurality of vertically spaced, horizontally extending bus bars each of which presents a flat surface in a vertical plane and a plurality of horizontally spaced, vertically extending tubular bus bars each having an indentation therein to present a flat surface and to connect each tubular bus bar to one of the horizontal bus bars with a low cost efficient electrical and mechanical connection that is formed by the flat surface on each tubular bus bar, a spacer having a pair of spaced flat surfaces and a means including a screw having a shank portion extending through openings in the flat surfaces in the tubular and the horizontal bus bars and the spacer for maintaining the flat surfaces of the spacer in tight engagement with the flat surfaces on the tubular and the horizontal bus bars.

A further object is to provide a control center with a plurality of vertically spaced, horizontally extending bus bars, each of which presents a flat surface in a vertical plane and a plurality of horizontally spaced, vertically extending tubular bus bars each having an indentation therein to present a flat surface and to connect each tubular bus bar to one of the horizontal bus bars with a low cost efficient electrical and mechanical connection that is formed by the flat surface on each tubular bus bar, a spacer having a pair of spaced flat surfaces and a means including a screw having a shank portion extending through openings in the flat surfaces in the tubular and the horizontal bus bars and the spacer for maintaining the flat surfaces of the spacer in tight engagement with the flat surfaces on the tubular and the horizontal bus bars and wherein the indented portions in at least two of the bus bars are unequally located from the ends of the bus bars.

Further objects and features of the invention will be readily apparent to those skilled in the art from the specification and appended drawing illustrating certain preferred embodiments in which:

FIG. 1 is a perspective view of a top portion of a cabinet section of a control center showing a connection between the horizontal and vertical bus bars according to the present invention.

FIG. 2 is a front elevational view of portions of the horizontal and vertical bus bars as shown in FIG. 1.

FIGS. 3 and 4 are side views of the left and center vertical bus bars in FIG. 2.

FIG. 5 is a cross sectional view taken along the line 5—5 in FIG. 2.

Referring to FIG. 1 of the drawings, a top portion of a cabinet section 10 for a control center preferably has a construction described in an application for United States patent having a Ser. No. 689,412, concurrently filed herewith. As disclosed the cabinet section 10 has a pair of side walls 12 and 14, a rear wall 16, a top cover 18 and a front vertical opening 20 which provides entry to the interior of the cabinet section 10. The interior of the cabinet section 10 is vertically divided by a plurality of unit mounting pans into a selected number of vertically stacked compartments each of which is arranged to receive a support 22 which carries switching devices, not shown, such as relays, manually operated switches, contactors, and the like. The devices carried by the supports 22 are electrically connected to a plug-in connector 24 carried on a rear wall 26 of the support 22. The plug-in connectors 24 are positioned on the rear wall 26 so that the spring biased jaws 28 carried by an insulating member 30 of the connectors clampingly engage the vertical bus bars indicated by numerals 32, 34 and 36 to make an electrical connection therewith when the support 22 is inserted into a proper position in the cabinet section 10, as depicted by the broken lines 38. The cells wherein the supports 22 are installed are closed by hinged covers 40.

Extending horizontally across the top portion of the cabinet section 10 are three horizontal metal bus bars 42, 44 and 46. The bus bars 42, 44 and 46 are supported in the cabinet in spaced relation to each other by insulators 48 that are carried by metal rods 50 which in turn are mounted in the cabinet section 10 by supports, not shown. The insulators 48 and the rods 50 support the bus bars 42, 44 and 46 in spaced relation to each other so a flat face 52 of each of the bus bars 42, 44 and 46 extends in a common vertical plane and a marginal edge 54 on the adjacent bus bars 42, 44 and 46 are spaced from each other.

As in conventional practice, when a plurality of cabinet sections 10 are assembled side by side to form an assembly known as a control center, the horizontal bus bars 42, 44 and 46 will extend continuously across the top portions of all of the cabinet sections 10. When this arrangement is employed, the metal panel 55 which forms a portion of the side walls 12 and 14 is omitted to permit the bus bars 42, 44 and 46 to extend between the adjacent cabinet sections 10.

Each of the vertical bus bars 32, 34 and 36 has a tubular cross section and is formed to have an indented portion therein. The indented portion 56 in the bus bar 32 is formed at one extreme end of the bus bar 32 while the indented portions 58 and 60 in the bus bars 34 and 36 are formed intermediate the ends of the bus bars wherein they are located so as to provide a stub end extending from the portion wherein the indentations are formed to a free end of the bus bar. That is, the bus bar 34 has its indentation 58 formed therein to provide a stub end 62 and the indentation 60 is formed in the bus bar 36 to provide a stub end 64 which has a length greater than the stub end 62. Each of the indentations 56, 58 and 60 are formed in the respective bus bars to provide a flat surface 61. The flat surfaces 61 in each of the bus bars is arranged to extend in a plane that is tangent to the outer surface of the tubular portion of the bus bar in a manner shown in FIGS. 3 and 4. The indentations are preferably formed by deforming the bus bars 32, 34 and 36 so that the tubular structure is completely collapsed to have the inner wall portions in intimate contact with each other with an opening 66 formed therein. Each of the vertical bus bars 32, 34 and 36 is connected to one of the horizontal bus bars 42, 44 and 46 and separated through air from the remaining horizontal bus bars 42, 44 and 46 by a spacer 68. Each of the spacers may be cylindrical and have flat surfaces 70 at its opposite ends and a bore 72 extending between the flat surfaces 70. Each of the horizontal bus bars 42, 44 and 46 is provided with a suitable opening 74. The openings 74 in the horizontal bus bars are located so the vertical bus bars 32, 34 and 36 will be horizontally spaced when they are attached to the horizontal bus bars 42, 44 and 46. The vertical bus bars 32, 34 and 36 are each attached to one of the horizontal bus bars 42, 44 and 46 by means of a screw 76 which has a headed portion 77 received in one of the indented portions 56, 58 and 60 and a shank portion 78 extending through the opening 66, the bore 72 in one of the spacers 68 and the proper opening 74 in one of the horizontal bus bars 42, 44 and 46. The flat surfaces 70 on the spacer 68 are held in tight engagement with the flat surface 61 on the bus bars 32, 34 and 36 and the flat surface 52 on the bus bars 42, 44 and 46 when a suitable spring washer 80 is positioned beneath the head of the screw 76 and a self-clinching nut 82 is applied to a threaded portion of the screw 76 to form a mechanically tight and electrical connection between the horizontal bus bars 42, 44 and 46 and the vertical bus bars 32, 34 and 36. The spacers 68 are provided to separate the vertical bus bars from the horizontal bus bars to provide a clearance through air to the bus bars of opposite polarity. As described in the application supra, in certain control center installations it is required that the switching devices be installed in cells at the extreme upper portions of the sections 10. When this arrangement is required, the jaw connectors 28 will be required to engage portions of the vertical bus bars 32, 34 and 36 in spaces located between the horizontal bus bars 42, 44 and 46 in a manner illustrated in FIG. 2 wherein it is shown that one set of the jaw connectors 28 engages the vertical bus bars 32, 34 and 36 at points intermediate the bus bars 42 and 44 and an additional set of jaw connectors 28 is arranged to engage the vertical bus bars 32, 34 and 36 in an area between the bus bars 44 and 46. The stub ends 62 and 64 provide an arrangement whereby this result may be accomplished without loss of the electrical clearance through air between bus bars of opposite polarity.

An additional advantage achieved by the connection between the vertical and horizontal bus bars as described resides in the accessibility of the heads 77 of the screws 76 when the doors 40 at the top portion of the cabinet section 10 are opened. The freely accessible heads 77 and the self-clinching type nuts 82 provide an arrangement whereby the connections between the vertical bus bars 32, 34 and 36 and the horizontal bus bars 42, 44 and 46 may be inspected and tightened without difficulty during periodic maintenance of the control center.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:
1. A bus bar structure in an electrical apparatus cabinet comprising:
   (a) three horizontal metal bus bars, each having a flat face extending between a pair of spaced marginal edges, means supporting the horizontal bus bars at a top portion of the cabinet so the flat faces of the three bus bars extend in a common vertical plane and the marginal edges extend horizontally in spaced relation to each other,
   (b) three longitudinally extending vertical metal bus bars each having a tubular cross section and an indented portion with the indented portions of each bus bar presenting a flat surface,
   (c) and means connecting the flat surface of each of the vertical bus bars to the flat surface of one of the three horizontal bus bars, said means including three metal spacers each having a pair of spaced parallel flat faces and a bore extending between the flat faces and a screw having a headed portion received in the indented portion and a shank portion extending through aligned openings in the indented portion, the bore in one of the spacers and an opening in the horizontal bus bar.

2. The bus bar structure recited in claim 1 wherein the flat surface on each vertical bus bar extends in a plane tangent to an outer surface of the tubular portion of the bus bar that is adjacent to the indented portion.

3. The bus bar structure recited in claim 1 wherein the indented portion on at least one of the three vertical bus bars is located at an end portion of the said one bus bar.

4. The bus bar structure recited in claim 1 wherein the indented portion on a first of the three vertical bus bars is located at an end portion of the first bus bar and the indented portion on a second of the three vertical bus bars is spaced from the ends of the said second bus bar.

5. The bus bar structure recited in claim 1 wherein the indented portion on a first of the three vertical bus bars is located at an end portion of the first bus bar and the indented portions on a second and a third of the three vertical bus bars are spaced from the ends of the three vertical bus bars.

6. The bus bar structure recited in claim 5 wherein the spaces between the indented portions and the ends of the second and the third bus bars are unequal.

7. The bus bar structure recited in claim 2 wherein the indented portion on at least one of the three vertical bus bars is located at an end portion of the said one bus bar.

8. The bus bar structure recited in claim 2 wherein the indented portion on a first of the three vertical bus bars is located at an end portion of the first bus bar and the indented portion on a second of the three vertical bus bars is spaced from the ends of the said second bus bar.

9. The bus bar structure recited in claim 2 wherein the indented portion on a first of the three vertical bus bars is located at an end portion of the first bus bar and the indented portions on a second and a third of the three vertical bus bars are spaced from the ends of the bus bars.

10. The bus bar structure recited in claim 9 wherein the spaces between the indented portions and the ends of the second and the third bus bars are unequal.

References Cited

UNITED STATES PATENTS

| | | |
|---|---|---|
| 2,258,750 | 10/1941 | Eichwald. |
| 2,648,032 | 8/1953 | Mekelburg _____ 317—117 |
| 3,309,580 | 3/1967 | Jacobs et al. _____ 317—119 |

FOREIGN PATENTS 1,417,350  10/1964  France.

LEWIS H. MYERS, Primary Examiner

G. P. TOLIN, Assistant Examiner

U.S. Cl. X.R.

174—71